United States Patent [19]

Hermann et al.

[11] 4,142,509
[45] Mar. 6, 1979

[54] SOLAR COLLECTOR COMPRISING AN EVACUATED COVER

[75] Inventors: Wilhelm Hermann; Horst Hörster, both of Roetgen; Johann Schröder; Faramarz Mahdjuri, both of Aachen, all of Fed. Rep. of Germany

[73] Assignee: U.S. Philips Corporation, New York, N.Y.

[21] Appl. No.: 820,414

[22] Filed: Aug. 1, 1977

[30] Foreign Application Priority Data

Aug. 5, 1976 [DE] Fed. Rep. of Germany ....... 2635262

[51] Int. Cl.² ................................................ F24J 3/02
[52] U.S. Cl. .................................. 126/270; 126/271; 165/135

[58] Field of Search .............................. 126/270, 271; 252/181.1, 181.2, 181.3, 181.4, 181.5, 181.6, 181.7; 316/25, 24, 30; 165/4, 134, 135

[56] References Cited

U.S. PATENT DOCUMENTS

| 1,801,710 | 4/1931 | Abbot | 126/271 |
| 3,270,802 | 9/1966 | Lindberg | 165/135 X |
| 3,896,042 | 7/1975 | Anderson | 252/181.6 X |
| 3,926,832 | 12/1975 | Barosi | 252/181.6 |

Primary Examiner—William F. O'Dea
Assistant Examiner—Larry Jones
Attorney, Agent, or Firm—William J. Streeter; Rolf E. Schneider

[57] ABSTRACT

A solar collector including at least one evacuated transparent cover tube provided with means for supplying hydrogen to and extracting hydrogen from the cover tube.

6 Claims, 3 Drawing Figures

SOLAR COLLECTOR COMPRISING AN EVACUATED COVER

This invention relates to a solar collector, comprising an absorber which is provided with at least one duct for transferring heat, obtained from solar radiation incident on the absorber, during operation to a heat transport medium in the duct, and a cover which thermally insulates the absorber from the surroundings and which consists of at least one sealed and evacuated transparent tube.

Solar collectors of the described kind in which a U-shaped absorber is sealed in an evacuated glass tube are known.

Also known are solar collectors in which a cover is provided over a flat absorber, said cover consisting of a plurality of evacuated glass tubes which are adjacently arranged in contact with each other.

When the heat cannot be discharged from the absorber of such an extremely efficient solar collector, for example, due to an interruption of the power supply of the water pump or if, for example, during the summer the energy production of the solar collector exceeds the energy demand and the storage capacity of the remainder of the installation, the temperature of the absorber may become too high. Temperatures of more than 200° C. may then occur. The solar collector may then become defective. Therefore, it must be ensured that the solar collector does not exceed a given critical temperature. This can be realized, for example, by a mechanical cover for the solar collector. Such a cover however, is complex and expensive and continuously requires maintenance.

The present invention has for its object to provide a solar collector whose radiation losses can be controlled, so that the absorber does not exceed a defined temperature.

In order to achieve this object, the solar collector in accordance with the invention is characterized in that the cover tube includes means for supplying hydrogen to and extracting hydrogen from the cover tube.

The invention is based on the recognition of the fact that the loss factor of a solar collector, i.e. the radiation losses thereof, increases substantially when the evacuated cover is filled with a gas having a high thermal conductivity at a pressure on the order of a few tens mbars. Thus, the solar collector cannot exceed a given temperature in critical circumstances.

Hydrogen is a very suitable filling gas, because the thermal conductivity $\lambda$ thereof is substantially higher than that of all other gases ($\lambda_{H_2}$ at 100° C. = 2110·10$^{-6}$ W/cm° C.; $\lambda_{air}$ at 100° C. = 314·10$^{-6}$ W/cm° C., at a pressure of 1 atmosphere absolute).

A preferred embodiment of the solar collector in accordance with the invention is characterized in that the means comprises a reservoir which is arranged inside the cover tube and which has at least one hydrogen passage, said reservoir containing a reversible heatable hydrogen getter.

In a preferred embodiment of the solar collector in accordance with the invention, the solar collector itself acts as a heat source for the reversible hydrogen getter above a given operating temperature.

If the temperature of the solar collector tends to become too high, the collector itself ensures, by heating the hydrogen getter to a given temperature, that sufficient hydrogen is desorbed from the getter to make the thermal conduction losses through the hydrogen so high that the collector does not exceed the maximum permissible temperature.

Automatic protection against excessively high collector temperatures is thus achieved in a structurally simple manner.

In accordance with the invention, the reversible hydrogen getter preferably consists of one or more of the metals calcium, niobium, titanium, zirconium, hafnium, scandium, yttrium, lanthanum and the rare earths, alloyed with one or more of the metals vanadium, chromium, manganese, iron, cobalt, nickel, molybdenum, ruthenium, rhodium, palladium and osmium, in a partly hydrogenized condition.

In a further embodiment of the solar collector in accordance with the invention, the reservoir comprises an electric heating element. However, other solutions are also possible, for example, the use of solar radiation which is concentrated on the reservoir by means of a lens and/or a mirror.

The reversible hydrogen getter in accordance with the invention then preferably consists of a metal from the group formed by titanium, zirconium, hafnium, scandium, yttrium, lanthanum, the rare earths, strontium, barium, vanadium, niobium, tantalum, thorium and alloys and mixtures of these metals, in a partly hydrogenized condition.

These metal hydrides have the property that they release hydrogen at relatively elevated temperatures, the hydrogen being completely absorbed again when the getter cools down.

The hydrides of the elements zirconium and titanium produce an adequate hydrogen pressure of from 0.1 mbar to some tens of mbars at comparatively low temperatures, for example, from 200° C. to 500° C., while they getter the hydrogen to a pressure of below 10$^{-3}$ Torr at temperatures below 200° C.

The hydrides are not used in stoichiometric combination, such as, for example $ZrH_2$, but rather with a hydrogen deficiency, for example, $ZrH_{1.1}$.

It is thus achieved that at the operating temperatures of the solar collector not only the hydrogen pressure is maintained below 10$^{-3}$ Torr, but that also an additional getter capacity for other gaseous impurities is obtained. When zirconium hydride is used, therefore, the barium getter often used for said gaseous impurities can be dispensed with. The non-stoichiometric combination is adjusted by the heating of the hydride and the evacuation of a defined quantity of hydrogen prior to the sealing of the cover tube.

The invention will now be described in detail with reference to the accompanying drawings, in which.

Figure 1:
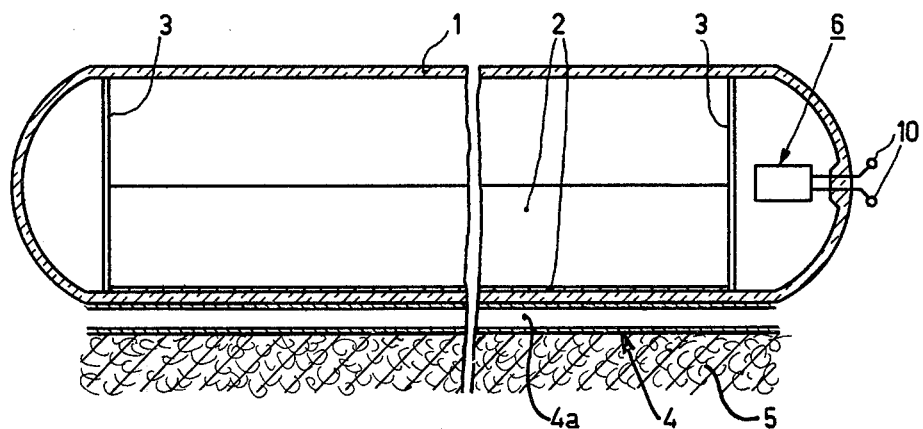
FIG. 1 is a longitudinal sectional view of a solar collector in accordance with the invention.

The solar collector shown in FIG. 1 comprises a plurality of adjacently arranged and contacting glass tubes 1, only one tube being shown in the longitudinal sectional view. The glass tubes 1 have a circular cross-section, are sealed at their ends and are evacuated to a residual gas pressure of less than 1 Torr. The tubes are provided on their inner surface, in the lower portion of the cross-section over an angle of at the most 180°, with a selective, solar radiation absorbing layer 2 which is made of, for example, nickel oxide or copper oxide on a metal substrate of silver, copper or aluminium. When a non-selective layer is used, the inner surface of the glass tubes 1 may be provided with a selective heat-reflective layer, for example, consisting of tin-doped indium oxide. The reference numeral 3 denotes two flat reflectors which extend transversely of the tube axis at the ends of the cylindrical region of the cover tubes 1 and which may consist of mica with a vapour-deposited layer of aluminium.

The glass tubes 1 are arranged directly on an absorber/heat exchanger 4 which preferably has an undulated profile, adapted to the circumference of the cover tubes 1, with integrated ducts 4a for a heat transport medium, for example, water. The heat exchanger 4 is thermally insulated on its lower surface by means of an insulating material 5, for example, mineral wool.

Each of the cover tubes 1 accommodates a hydrogen source 6 which includes a container 7 which contains a material 8 which releases hydrogen at higher temperatures and which absorbs hydrogen at lower temperatures.

Figure 2:
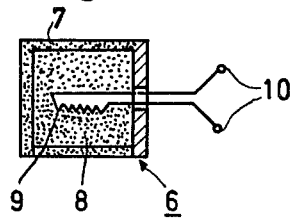
FIG. 2 is a sectional view of the container with a reversible hydrogen getter used in the solar collector shown in FIG. 1.

The container 7, having a volume of, for example, 1 cm$^3$, comprises hydrogen-permeable walls, for example, in the form of a fine-meshed sieve (FIG. 2).

The hydrogen releasing and absorbing material 8 consists of a metal hydride, for example, 1 g zirconium hydride $ZrH_{1.1}$. The container 7 furthermore comprises an electric heating element 9 of, for example, 5 W, the connections 10 thereof being brought out through the cover tube 1.

In critical circumstances, i.e. when there is a risk of inadmissible temperature rises, the zirconium hydride 8 can be heated to a temperature of approximately 650° C. by the application of a low voltage, for example, a battery voltage of 6 V or 12 V, to the connections 10 of the heating element 9, so that the cover tube 1 is filled with hydrogen at a pressure of a few Torr. When the voltage is switched off again, the hydride cools down and the vacuum pressure of $<10_{-3}$ Torr is restored by absorption of hydrogen.

When the solar collector is covered with snow in winter, the hydrogen released by heating of the metal hydride can provide such a high heat conductivity that the snow present on the cover tubes melts as a result of the supply of heat from the collector system.

Figure 3:
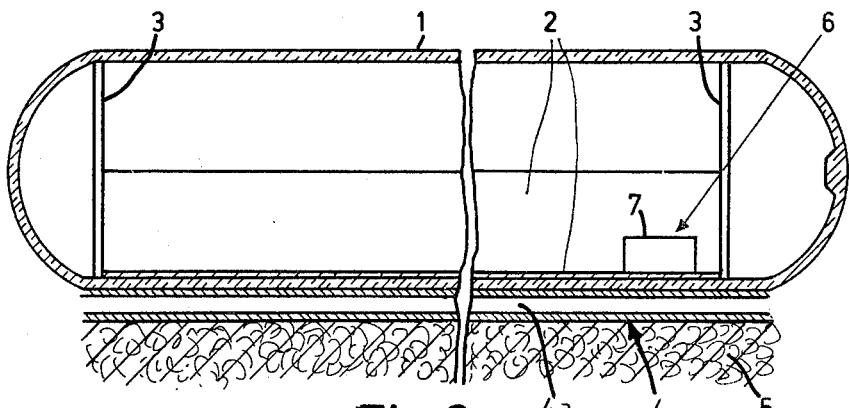
FIG. 3 is a longitudinal sectional view of a further solar collector in accordance with the invention.

The solar collector shown in FIG. 3 is substantially similar to that shown in FIG. 1. Therefore, the same reference numerals are used for corresponding parts.

The hydrogen source 6 with the container 7 is arranged in suitable thermal contact with the absorber/heat exchanger 4. The container 7 contains, for example, 200 mg of $ZrV_{1.8}Mn_{0.2}H_{2.6}$ or $ZrV_{1.8}Co_{0.2}H_{2.4}$, which are materials which exhibit a hydrogen equilibrium pressure of approximately $5 \cdot 10^{-3}$ Torr in the temperature range of from 70° C. to 80° C., which pressure is a negligibly low value for heat conduction purposes. The hydrogen equilibrium pressure amounts to 1 Torr at about 170° C.

It is only at a getter temperature of approximately 140° C. (hydrogen equilibrium pressure approximately 0.1 Torr), that the heat conduction by the hydrogen becomes somewhat noticeable.

When the absorber/heat exchanger 4 tends to exceed, for example, a temperature of 170° C., the hydrogen at a pressure of approximately 1 Torr, released by the getter in the holder 7 heated to this temperature, causes such high heat conduction losses that the temperature of the solar collector does not further increase.

Obviously, the container 7 may also be arranged, for example, on the inner wall of the glass tube 1 at an area which assumes a comparatively high temperature during operation.

What is claimed is:

1. A solar collector, which comprises an absorber provided with at least one duct for transferring heat, obtained from solar radiation incident on the absorber during operation, to a heat transport medium in the duct, a cover thermally insulating the absorber from the surroundings and consisting of at least one sealed and evacuated transparent tube, and means for supplying hydrogen to and extracting hydrogen from the cover tube.

2. A solar collector according to claim 1, in which said means comprises a reservoir arranged inside the cover tube and having at least one hydrogen passage and containing a reversible heatable hydrogen getter.

3. A solar collector according to claim 2, in which the solar collector itself acts as a heat source for the reversible hydrogen getter above a given operating temperature.

4. A solar collector according to claim 3, in which the reversible hydrogen getter consists of one or more of calcium, niobium, titanium, zirconium, hafnium, scandium, yttrium, lanthanum and the rare earths, alloyed with one or more of vanadium, chromium, manganese, iron, cobalt, nickel, molybdenum, ruthenium, rhodium, palladium and osmium, in a partly hydrogenized condition.

5. A solar collector according to claim 2, in which the reservoir is provided with an electric heating element.

6. A solar collector according to claim 5, in that the reversible hydrogen getter consists of a metal selected from titanium, zirconium, hafnium, scandium, yttrium, lanthanum, the rare earths, strontium, barium, vanadium, niobium, tantalum, thorium and alloys and mixtures of these metals, in a partly hydrogenized condition.

* * * * *